United States Patent
Arroyo

(10) Patent No.: US 6,205,141 B1
(45) Date of Patent: Mar. 20, 2001

(54) METHOD AND SYSTEM FOR UN-TAGGED COMMAND QUEUING

(75) Inventor: Keith M. Arroyo, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 0 days.

(21) Appl. No.: 09/345,153

(22) Filed: Jun. 30, 1999

(51) Int. Cl.[7] .................................................. H04L 12/56
(52) U.S. Cl. ............................................................ 370/392
(58) Field of Search .................................... 370/352, 401, 370/389, 392, 410

(56) References Cited

U.S. PATENT DOCUMENTS

| | | | |
|---|---|---|---|
| 5,452,464 | * 9/1995 | Nomura et al. | 395/775 |
| 5,519,695 | 5/1996 | Purohit et al. | 370/58.2 |
| 5,729,719 | 3/1998 | Gates | 395/550 |
| 5,742,792 | 4/1998 | Yanai et al. | 395/489 |
| 5,881,245 | 3/1999 | Thompson | 395/200.49 |
| 5,941,972 | 8/1999 | Hoese, et al. | 710/129 |

* cited by examiner

Primary Examiner—Joseph L. Felber
(74) Attorney, Agent, or Firm—Gray Cary Ware & Freidenrich, LLP

(57) ABSTRACT

A method and system are disclosed for processing tagged commands from a Fibre Channel host in a Fibre Channel network to one or more SCSI streaming target devices through a SCSI router. The method includes the step of determining whether the command is a tagged command. If the command is a tagged command, then the command processing method of the current invention determines whether the intended target device is a streaming target device. If the intended target device is a streaming target device, the method and system of the present invention can convert the command's format from a tagged command format to an un-tagged format and forward the command to the intended target device. Flags in an internal SCSI router register can be set to track which, if any, devices attached to the SCSI router can support tagged commands. Upon completion of the command, the method of the present invention can forward the command complete message to the issuing Fibre Channel host.

37 Claims, 2 Drawing Sheets

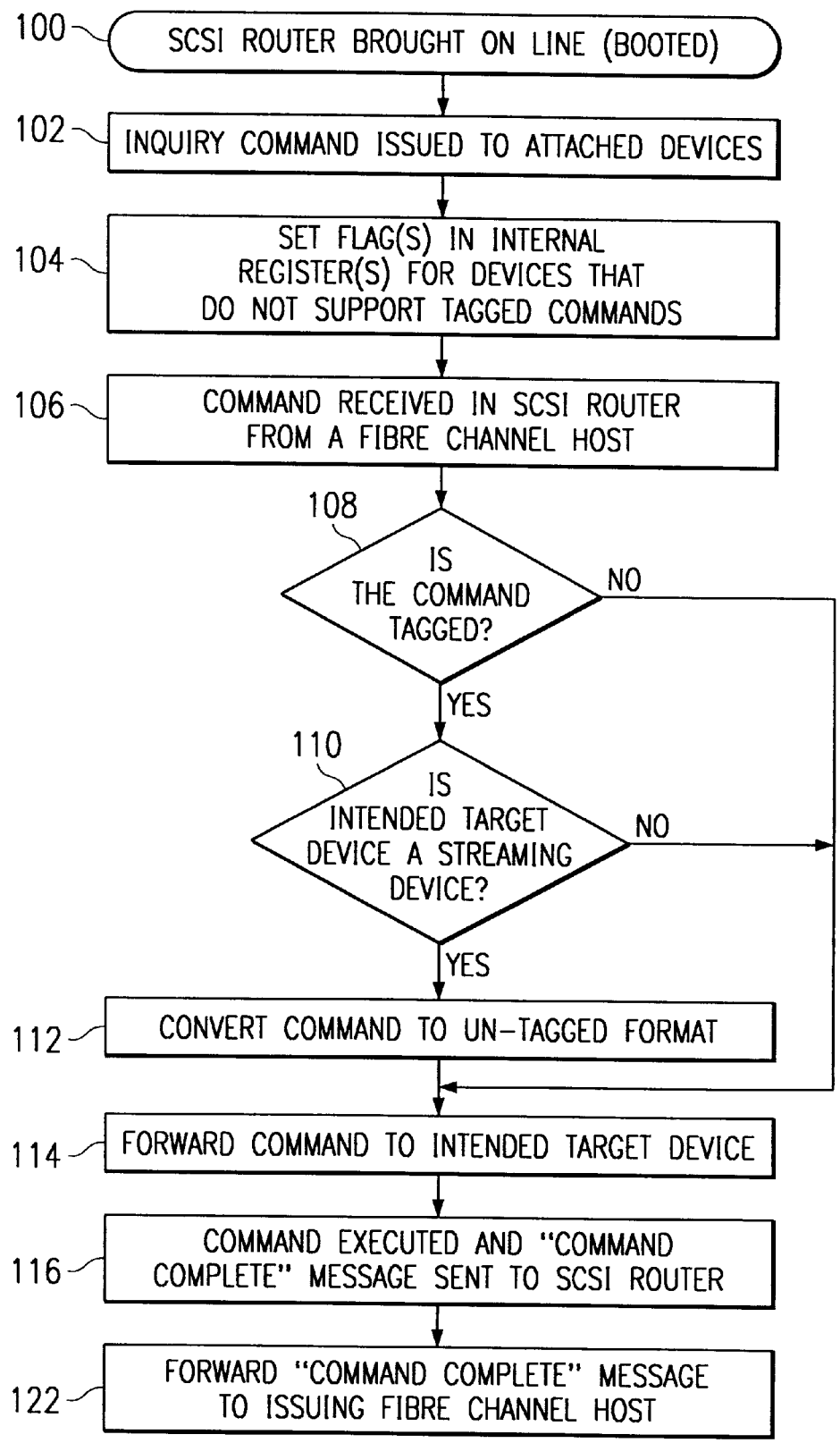

METHOD AND SYSTEM FOR UN-TAGGED COMMAND QUEUING

TECHNICAL FIELD OF THE INVENTION

The present invention relates generally to data and information communications systems and their operations, and more particularly to communications networks, including a Fibre Channel network. Even more particularly, the present invention relates to a Fibre Channel-to-SCSI network system and method of operation having the ability to convert tagged commands intended for a streaming target device to an un-tagged command format through processing in a SCSI router to improve network performance and avoid the loss of data that may occur as a result of sending a tagged command to a streaming target device.

BACKGROUND OF THE INVENTION

In a Fibre Channel-to-SCSI router architecture, one SCSI initiator (interface), such as a SCSI router, can speak to SCSI targets on behalf of many Fibre Channel initiators (hosts). These Fibre Channel hosts can be attached to the SCSI router from many different interfaces. However, a SCSI target is only aware of the SCSI router interface connection to which it is directly attached. If two or more Fibre Channel hosts issue commands to the same target device, the target device sees all the commands as originating from the SCSI router. The target device is not aware of the individual Fibre Channel hosts.

Furthermore, in the SCSI architecture, a streaming target device, such as a tape back-up device, is a target device that must complete execution of one command before a subsequent command can be recognized, even if it is from the same host. A host issuing a subsequent command to a streaming target device that is still executing a prior command from the same or another host is issued a check condition (overlapped_cmd) response by the streaming target device. This can result in loss of the subsequent command and disruption of I/O transmissions.

Most currently existing Fibre Channel host drivers provide support only to random access devices, such as disk devices, that support tagged command queuing. Tagged command queuing is a method for managing commands to and from target devices that allows a host to issue multiple commands to a target device with a "tag" attached to the command. A target device receiving a tagged command will complete the command and upon completion return a "command complete" message to the issuing host with a corresponding tag informing the host that the particular command identified by that tag is complete. The host, meanwhile, can issue additional commands before the first command (or any subsequent command) completes, and keep track of completed commands by the return tag data from the target device. In this way, a Fibre Channel host can keep track of which completion is related to which command. Command tag queuing increases the I/O performance for most random access devices such as disk devices.

However, streaming target devices (such as tape backup devices) as a general rule do not support tagged command queuing. This is because of the inability of streaming target devices to process more than one command at a time. To a streaming target device, a tagged command indicates that it will receive multiple concurrent commands. A streaming target device receiving a tagged command assumes that because the command is tagged the host issuing the command will also issue subsequent commands before the first command has executed. Streaming target devices will therefore reject any tagged command. Currently existing Fibre Channel host drivers can thus cause a disruption of I/O transmissions by issuing a tagged command to a streaming target device.

Although some currently existing Fibre Channel host driver's specifications do provide for the issuing of un-tagged commands on the Fibre Channel side, many legacy devices and drivers are still in use that do not support un-tagged command queuing. As a result, most Fibre Channel-to-SCSI networks do not possess the capability to issue un-tagged commands to streaming target devices and instead are faced with reduced network performance caused by streaming target devices rejecting tagged commands.

Furthermore, even if all the commands received by a streaming target device are un-tagged, any subsequent concurrent commands are rejected until the first command has completed execution, causing a decline in network performance and possible loss of data. Although normally the same host will not issue multiple concurrent commands to a streaming target device, in a multi-host Fibre Channel network environment, individual Fibre Channel hosts are unaware of the commands issued by the other hosts on the network to a particular streaming target device. Each host in the Fibre Channel network sees a target device as if it alone were speaking to the target device. As a result, a host on the Fibre Channel network can unknowingly issue an overlapping command to a streaming target device.

When a streaming target device receives a second command (or a third or fourth command) before completion of a prior command, it will send a check condition (overlapped_cmd) response to the host issuing the subsequent concurrent command. This can cause the host that issued the subsequent concurrent command(s) to go into error recovery.

The rejection of subsequent concurrent commands or of a tagged command by a streaming target device can result in a loss of data. For example, many tape back-up devices do not handle errors. If a tag command or multiple commands are issued to such a tape back-up device, it may abort the back-up. This can result in corrupted or lost data and in disruption of I/Os between host and target devices. Because of the inability of current command processing systems and methods to handle tagged commands (or multiple concurrent commands, whether tagged or un-tagged), to a streaming target device, some operations may have to be completely re-executed and not simply re-started.

SUMMARY OF THE INVENTION

Therefore, there is a need for a method and system that addresses the performance limitations arising in the known methods and systems for processing tagged commands to streaming target devices in a Fibre Channel-to-SCSI network. In particular, a need exists for a method and system that processes tagged commands to a streaming target device without the decline in network performance and data loss problems occurring in known Fibre Channel-to-SCSI architecture command processing methods and systems.

A further need exists for a method and system for processing tagged commands to a target device having the capability to determine whether the intended target device is a streaming target device.

An even further need exists for a Fibre Channel-to-SCSI architecture command processing method and system with the ability to convert tagged commands issued to a streaming target device to an un-tagged command format, to avoid the command rejection and general application failures that may occur in a streaming target device upon receipt of a tagged command.

A still further need exists for a Fibre Channel-to-SCSI architecture command processing method and system that overcomes the inability of current Fibre Channel host drivers to send un-tagged commands to streaming target devices, and thereby avoid the rejection of un-tagged commands and the consequent decline in Fibre Channel network performance.

An even further need exists for a Fibre Channel-to-SCSI architecture command processing method and system that processes multiple concurrent tagged commands to a streaming target device without a decline in network performance or the general application failures that may occur in streaming target devices upon receipt of concurrent commands from a Fibre Channel host in a Fibre Channel network.

In accordance with the present invention, a method and system for processing tagged commands to a SCSI streaming target device through a SCSI router is provided that substantially eliminates or reduces disadvantages and problems associated with known such systems and methods, including the problems of limited network performance, loss of data in certain applications, command rejection, and general application failures.

More specifically, the present invention provides a method and system for processing tagged commands from a Fibre Channel host in a Fibre Channel network to one or more SCSI streaming target devices through a SCSI router. The method includes the step of determining whether the command is a tagged command. If the command is a tagged command, then the command processing method of the current invention determines whether the intended target is a streaming target device. If the intended target is a streaming target device, the method and system of the present invention can convert the command's format from a tagged command format to an un-tagged format and forward the command to the intended target.

The tagged command processing method of the current invention can determine whether a SCSI target device attached to a SCSI router is a streaming target device. By issuing an inquiry command to the attached SCSI target devices, the SCSI router can determine if the SCSI target devices support tagged commands. Based on the inquiry data returned from the inquiry command, the SCSI router can set one or more flags in an internal register to indicate which, if any, of the SCSI target devices attached to the SCSI router support tagged commands (or which do not). An inquiry command can be issued when a SCSI router first comes on-line or following a subsequent re-boot. Additionally, an inquiry command can be issued by any Fibre Channel host during operation.

Embodiments of the tagged command processing method of the current invention can be used in combination with the "Method and System for Multi-Initiator Support to Streaming Devices in a Fibre Channel Network" disclosed in related U.S. patent application Ser. No. 09/317,800, filed on May 24, 1999. Furthermore, the command tagged processing method and system of this invention can also be used in combination with the "Streaming Method and System for Fibre Channel Network Devices" disclosed in related U.S. patent application Ser. No. 09/259,160, filed on Feb. 26, 1999. Both of these related applications are herein incorporated by reference in their entirety.

As a technical advantage, the command processing method of the present invention addresses the performance limitations arising in the known methods and systems for processing tagged commands to streaming target devices in a Fibre Channel-to-SCSI network. In particular, the command processing method of the present invention can provide for processing tagged commands to a streaming target device without the decline in network performance and data loss problems occurring in known Fibre Channel-to-SCSI architecture command processing methods and systems.

Further, the present invention provides a method and system for processing tagged commands to a streaming target device having the capability to determine whether the intended target device is a streaming target device.

Even further, the present invention provides a Fibre Channel-to-SCSI architecture command processing method and system with the ability to convert tagged commands issued to a streaming target device to an un-tagged command format, thereby avoiding the command rejection and general application failures that may occur in a streaming target device upon receipt of a tagged command.

Still further, the present invention provides a Fibre Channel-to-SCSI architecture command processing method and system that overcomes the inability of current Fibre Channel host drivers to send un-tagged commands to streaming target devices, and thereby avoids the rejection of un-tagged commands and the consequent decline in Fibre Channel network performance.

An even further technical advantage of the present invention is that it provides a Fibre Channel-to-SCSI architecture command processing method and system that can process multiple concurrent tagged commands to a streaming target device without a decline in network performance or the general application failures that may occur in streaming target devices upon receipt of concurrent commands from a Fibre Channel host in a Fibre Channel network.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 3 shows a flow chart of one embodiment of the operational steps according to the teaching of the present invention.

DETAILED DESCRIPTION OF THE INVENTION

Figure 1:
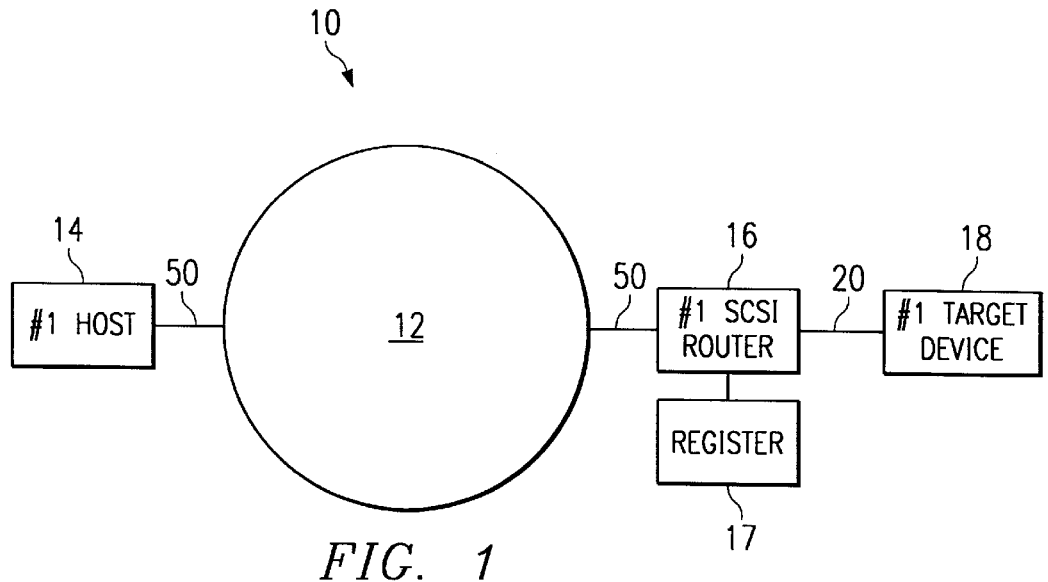
FIG. 1 illustrates a Fibre Channel network for incorporating an embodiment of the method for processing tagged commands to a streaming target device through a SCSI router of the present invention.

Preferred embodiments of the present invention are illustrated in the Figures, like numerals being used to refer to like and corresponding parts of various drawings.

The present invention provides the capability, in a Fibre Channel-to-SCSI network, to process tagged commands through a SCSI router to a streaming target device that may not support tagged commands. If a Fibre Channel host driver supports only random access devices, such as disk drives, that can accept tagged commands, it may be able to issue only tagged commands that are not supported by certain streaming target devices (such as tape back-up devices). The method and system for processing tagged commands to a streaming target device of the present invention can convert a tagged command from a Fibre Channel host into an un-tagged command format so that a streaming target device will not reject it. The converted command can instead be treated by a streaming target device as would any other un-tagged command and be executed accordingly.

Upon completion of the now un-tagged command, the streaming target device can issue a "command complete" message to the issuing Fibre Channel host. The SCSI router can then forward the command complete signal to the originating Fibre Channel host. In this way, the functionality of the tagged command protocol is maintained on the Fibre Channel side, while the command itself is converted to an un-tagged format to ensure its execution on the SCSI side. The system and method of the present invention for processing tagged commands to a streaming target device therefore maintains the integrity of the Fibre Channel-to-SCSI network by not rejecting tagged commands directed to a device that cannot support tagged commands.

If the SCSI router receives an un-tagged command, the method and system of the present invention simply forward the un-tagged command to the intended target device. Un-tagged commands are supported by both streaming devices and random access devices and will not cause the problems toward which the present invention is directed.

The tagged command processing method of the present invention can be equally functional in a Fibre Channel network having more than one SCSI router, wherein each SCSI router can have multiple streaming target devices attached to and receiving commands from it. In particular, when combined with the invention disclosed in related U.S. patent application Ser. No. 09/317,800, filed on May 24, 1999, entitled "Method and System for Multi-Initiator Support to Streaming Devices in a Fibre Channel Network," the tagged command processing method of the present invention is useful for maintaining network efficiency and avoiding data loss and communications failures caused by the issuance of multiple concurrent commands to a streaming target device in a network comprised of multiple Fibre Channel hosts.

The method and system for multi-initiator support to streaming devices in a Fibre Channel network of the above-referenced invention provide the capability to queue multiple concurrent commands to a streaming target device such that the commands are forwarded to and received by the streaming target device only after the streaming target device has completed execution of a prior command. However, the problem remains that any tagged commands among the commands queued to be forwarded to the streaming target device will be rejected in the manner described herein. Therefore, the tagged command processing method of the present invention can be used in combination with the method and system for multi-initiator support to streaming devices in a Fibre Channel network of the above-referenced invention to convert any tagged commands to an untagged format and process the converted commands to the streaming target device without rejection. This can be accomplished even if one or more of the commands are received while a prior command is being executed by the streaming target device.

Similarly, the tagged command processing method of this invention can be used in combination with the "Streaming Method and System For Fibre Channel Network Devices" disclosed in related U.S. patent application Ser. No. 09/259,160, filed on Feb. 26, 1999 (the "Streaming Application").

The Streaming Application discloses a method and system for processing read/write commands to a target device (including a streaming target device), regardless of the size of the read/write command. However, once again tagged commands received by the streaming target device are subject to rejection as described above. Therefore, the tagged command processing method of this invention can be used in combination with the invention disclosed in the Streaming Application to convert any tagged read/write commands received for a streaming target device to an un-tagged format, and to process the converted commands to the streaming target device without rejection regardless of their size. The speed and efficiency of a Fibre Channel-to-SCSI network environment can thereby be improved.

In FIG. 1 there appears a conceptual diagram of Fibre Channel network 10 in which the method and system of this invention can be implemented. Fibre Channel network 10 can include network link 12 for connecting #1 host 14 with #1 SCSI router 16 via network links 50. #1 target device 18 connects to #1 SCSI router 16 via SCSI network link 20. #1 target device 18 can be a streaming target device. Network links 50 can be any Fibre Channel network connection, and SCSI network link 20 can be any SCSI network connection. FIG. 1 is a simple one-host/one-target Fibre Channel-to-SCSI network, but the method and system for processing tagged commands to a streaming target device of the present invention can be implemented in a Fibre Channel network having multiple Fibre Channel hosts, multiple SCSI routers, and multiple network target devices. FIG. 1 further includes flag register 17 of #1 SCSI router 16 for tracking which target devices, such as #1 target device 18, are capable of supporting tagged commands or not capable of supporting tagged commands.

Figure 2:
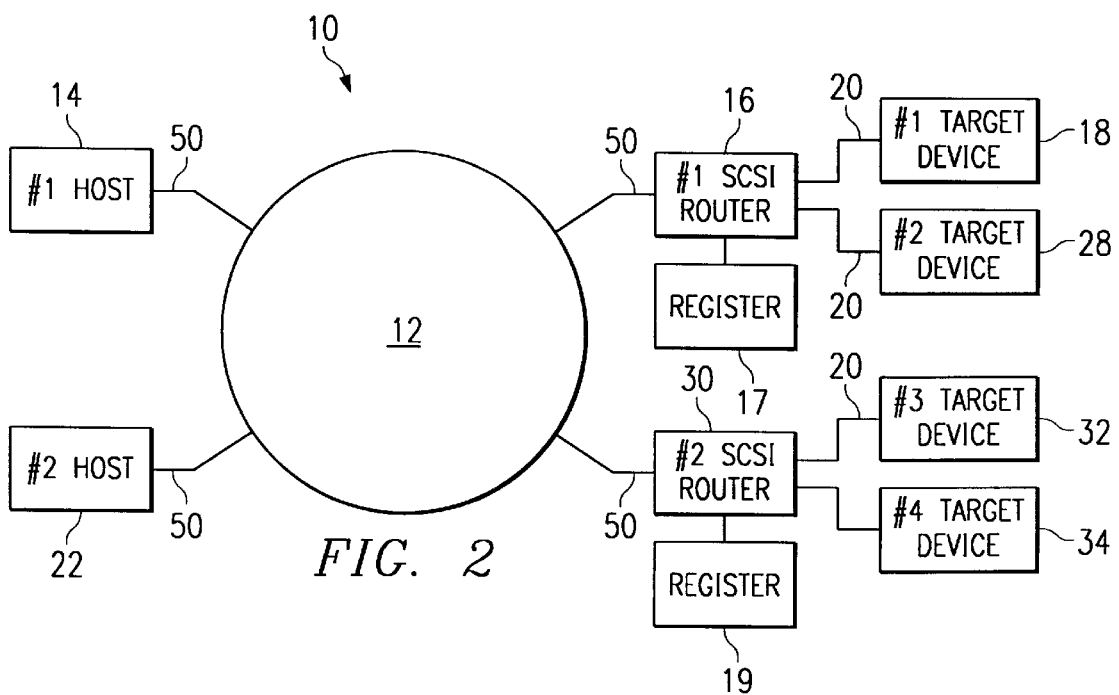
FIG. 2 illustrates the use of the present invention in a multi-host, multi-router, and multi-streaming target device Fibre Channel network.

FIG. 2 shows a modified Fibre Channel network 10 illustrating the capability of the present invention to process commands from multiple Fibre Channel hosts to multiple target devices through multiple SCSI routers. Fibre Channel network 10 now includes #2 host 22 and #2 SCSI router 30 communicatively connected to Fibre Channel network link 12 via network links 50. Register 19 is associated with #2 SCSI router 30 and can have the same functionality as register 17.

1 SCSI router 16 is communicatively connected to #1 target device 18 and #2 target device 28 via SCSI network links 20. #2 SCSI router 30 is communicatively connected to #3 target device 32 and #4 target device 34 via SCSI network links 20. While FIG. 2 shows a closed Fibre Channel network 10, it is possible to add both SCSI routers, Fibre Channel hosts, and target devices to Fibre Channel network 10. The tagged command processing method of the present invention can function with multiple hosts, multiple SCSI routers, and multiple target devices. The number of SCSI routers, target devices, and hosts is limited by the SCSI router and Fibre Channel network capacity.

FIG. 3 is a flow chart diagramming the overall operation of an embodiment of the method for processing tagged commands to a streaming target device through a SCSI router of the present invention. At step 100, a SCSI router (such as #1 SCSI router 16 of FIG. 1) is brought on-line (booted). Once brought on-line, SCSI router 16, at step 102 of FIG. 3, issues an inquiry command to all the target devices attached to SCSI router 16. The inquiry command is sent to the attached devices to determine which, if any, of the attached target devices can support tagged commands or cannot support tagged commands. An inquiry command can be issued not only upon initial booting of SCSI router 16, but also can be issued upon a re-booting of SCSI router 16 due to maintenance or failure. Alternatively, an inquiry command can be issued from either a Fibre Channel host or SCSI router 16 during operation to determine if any devices newly brought on-line can support tagged commands.

At step 104, SCSI router 16 can set one or more flags in one or more internal registers (such as register 17 from FIG. 1) to indicate for a given target device if that target device supports tagged commands. If a SCSI target device supports tagged command queuing, SCSI router 16 will allow subsequently received tagged commands to be issued as tagged commands to that SCSI target device. If a particular SCSI target device does not support tagged command queuing, SCSI router 16 will instead convert the tagged command queuing commands to un-tagged commands as further illustrated in subsequent steps of FIG. 3.

At step 106, SCSI router 16 receives a command from a Fibre Channel host (such as Fibre Channel host 14 of FIG. 1). At step 108, the method of this invention determines within SCSI router 16 whether the command received from Fibre Channel host 14 is a tagged command or an un-tagged command. If the command is an un-tagged command, SCSI router 16, at step 114, forwards the command to the intended SCSI target device. If the command is a tagged command, then at step 110, SCSI router 16 determines whether the intended target device is a streaming target device, based on the flag(s) set in internal register 17.

If the intended target device is not a streaming target device, then at step 114 the tagged command processing method of the present invention simply forwards the command to the intended target from SCSI router 16. If the intended target device is a streaming target device, then at step 112 the tagged command processing method of this invention converts the command from a tagged format to an un-tagged format within SCSI router 16. The command can then be forwarded at step 114 to its intended streaming target device and will not be rejected by the streaming target device because of its formatting. At step 116, the intended streaming target device (or simply the intended target device if it is not a streaming target device) executes the command and returns a command complete signal to SCSI router 16.

One aspect of the method and system for processing tagged commands to a streaming target device of this invention is that the conversion of a tagged command to an untagged format is transparent to the Fibre Channel host issuing the tagged command. Thus, at step 122, SCSI router 16 forwards the command complete signal to the Fibre Channel host that issued the tagged command without the Fibre Channel host being aware that a conversion took place.

The method and system for processing tagged commands to a streaming target device of the present invention can eliminate the rejection of tagged commands by streaming target devices that do not support the tagged command protocol. By changing the command attributes to an un-tagged command, a streaming target device can execute the command. Currently existing Fibre Channel host drivers that do not support streaming target devices can thus be made able to communicate (engage in I/Os) with all target devices in a Fibre Channel-to-SCSI network, whether they are streaming target devices or random access devices. Currently existing Fibre Channel host drivers whose specifications support only random access target devices can therefore be used with streaming target devices, without the reduction in network performance caused by rejected commands.

The method of the present invention provides, in either a single-host or a multi-host Fibre Channel network environment, the capability for processing tagged commands to a streaming target device or to multiple streaming target devices, without rejection of the commands, loss of communications, loss of data, or reduction in network performance. Additionally, the un-tagged command processing method of the present invention, in combination with the previously referenced U.S. Patent Applications, provides the capability for processing multiple concurrent commands to a streaming target device, and the capability to process read/write commands to a streaming target device, regardless of the length of the read/write command. Network efficiency, performance, and robustness are therefore maintained at a level higher than that achievable with currently existing command processing methods and systems.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for processing tagged commands from a Fibre Channel host in a Fibre Channel network to one or more target devices through a SCSI router, comprising the steps of, in the SCSI router:

receiving a command from a Fibre Channel host for an intended one of the one or more target devices;

determining whether the command is a tagged command;

if the command is a tagged command, then if the intended one of the one or more target devices is a streaming target device, converting the command's format to an un-tagged command format; and forwarding the command to the intended one of the one or more target devices.

2. The method of claim 1, wherein at least one of the one or more target devices is a streaming target device.

3. The method of claim 1, further comprising the steps of:

receiving a command complete message from the intended one of the one or more target devices when the command has been completed; and forwarding the command complete message to the Fibre Channel host that issued the command.

4. The method of claim 1, further comprising the step of determining whether any of the one or more target devices are streaming target devices, wherein the step comprises:

issuing an inquiry command to the one or more target devices to determine which ones of said one or more SCSI target devices do not support tagged commands; and setting one or more flags in an internal register to indicate, based on the inquiry data returned, which ones of said one or more target devices do not support tagged commands.

5. The method of claim 4, wherein said step for determining whether any of the one or more target devices are streaming target devices is performed on initial booting of the SCSI router.

6. The method of claim 4, wherein said step for determining whether any of the one or more target devices are streaming target devices is performed on re-boot.

7. The method of claim 4, wherein said inquiry command is issued from the Fibre Channel host.

8. The method of claim 1, wherein the SCSI router is a Crossroads model 4100 or model 4200.

9. The method of claim 1, wherein the Fibre Channel network further comprises a plurality of SCSI routers.

10. The method of claim 9, wherein each of the plurality of SCSI routers has at least one target device connected to and receiving commands from said each of the plurality of SCSI routers.

11. The method of claim 1, wherein the streaming target device is a tape backup device.

12. The method of claim 1, wherein the streaming target device is an optical device.

13. A system for processing tagged commands from a Fibre Channel host in a Fibre Channel network to one or more target devices through a SCSI router, comprising:
   instructions for receiving a command in the SCSI router from a Fibre Channel host for an intended one of the one or more target devices;
   instructions for determining whether the command is a tagged command;
   if the command is a tagged command, instructions for converting the command's format to an un-tagged command format if the intended one of the one or more target devices is a streaming target device; and
   instructions for forwarding the command to the intended one of the one or more target devices.

14. The system of claim 13, wherein at least one of the one or more target devices is a streaming target device.

15. The system of claim 13, further comprising:
   instructions for receiving a command complete message from the intended one of the one or more target devices; and
   instructions for forwarding the command complete message to the Fibre Channel host that issued the command.

16. The system of claim 13, further comprising instructions for determining whether any of the one or more target devices are streaming target devices, wherein the instructions comprise:
   instructions for issuing an inquiry command to the one or more target devices to determine which ones of said one or more SCSI target devices support tagged commands; and
   instructions for setting one or more flags in an internal register to indicate, based on the inquiry data returned, which ones of said one or more target devices do not support tagged commands.

17. The system of claim 16, wherein said instructions for determining whether any of the one or more target devices are streaming target devices are executed on initial booting of the SCSI router.

18. The system of claim 16, wherein said instructions for determining whether any of the one or more target devices are streaming target devices are executed on re-boot.

19. The system of claim 16, wherein said inquiry command is issued from the Fibre Channel host.

20. The system of claim 13, wherein the SCSI router is a Crossroads model 4100 or 4200.

21. The system of claim 13, wherein the Fibre Channel network further comprises a plurality of SCSI routers.

22. The system of claim 21, wherein each of the plurality of SCSI routers has at least one target device connected to and receiving commands from said each of the plurality of SCSI routers.

23. The system of claim 13, wherein said instructions for receiving, said instructions for determining, said instructions for converting, and said instructions for forwarding are performed in the SCSI router.

24. A method for processing multiple commands to a streaming target device through a SCSI router in a Fibre Channel network having a plurality of Fibre Channel hosts, comprising the steps of, in the SCSI router:
   creating a FIFO queue;
   receiving a first command from one of the plurality of Fibre Channel hosts;
   if the first command is a tagged command, converting the command's format to an un-tagged format;
   forwarding the first command to the streaming target device;
   processing a subsequent command from one of either said one of the plurality of Fibre Channel hosts or from one of other ones of the plurality of Fibre Channel hosts, comprising:
      (a) receiving the subsequent command in the SCSI router;
      (b) if the subsequent command is a tagged command, converting the command's format to an untagged format
      (c) determining whether the streaming target device has completed execution of the first command;
      (d) if the streaming target device has completed execution of the first command, forwarding the subsequent command to the streaming target device;
      (e) if the streaming target device has not completed executing the first command, placing the subsequent command in the FIFO queue; and
      (f) forwarding the subsequent command from the FIFO queue to the streaming target device upon completion of the first command by the streaming target device; and
   repeating the step of processing a subsequent command from one of either said one of the plurality of Fibre Channel hosts or said one of other ones of the plurality of the second Fibre Channel hosts for at least one additional subsequent command, wherein the subsequent command is the first command and the at least one additional subsequent command is the subsequent command.

25. The method of claim 24, further comprising the steps of:
   receiving a command complete message from the streaming target device when a command has been completed; and
   forwarding the command complete message to the Fibre Channel host that issued the command.

26. The method of claim 24, wherein the Fibre Channel network further comprises a single Fibre Channel host and wherein said step of processing a subsequent command comprises processing a subsequent command from the single Fibre Channel host.

27. The method of claim 24, wherein the Fibre Channel network further comprises a plurality of SCSI routers.

28. The method of claim 27, wherein each of the plurality of SCSI routers has at least one streaming target device connected to and receiving commands from said each of the plurality of SCSI routers.

29. The method of claim 28, further comprising the step of creating a separate FIFO queue in said each of the plurality of SCSI routers for each of the at least one streaming target devices connected to said each of the plurality of SCSI routers.

30. A method for processing commands to a sequential access target device ("SATD") through a SCSI router in a Fibre Channel network having a plurality of Fibre Channel hosts, comprising the steps of, in the SCSI router:

(a) receiving a command from one of the plurality of Fibre Channel hosts;

(b) if the command is a tagged command, converting the command's format to an un-tagged format;

(b) if the command requires a transfer of data larger than a threshold size, streaming the data to the SATD; and (c) if the command requires a data transfer smaller than the threshold size, storing the data in one or more memory buffers as they become available and forwarding the data to the SATD.

31. The method of claim 30, wherein streaming the data to the SATD comprises:

(a) determining if a preset size memory block is free;

(b) if the preset size memory block is free, requesting a data block from the Fibre Channel host that issued the command, otherwise holding-off the Fibre Channel host that issued the command;

(c) receiving the data block from the Fibre Channel host that issued the command and storing the data block in a FIFO queue;

(d) repeating steps (a)–(c) until an initial number of data blocks are received and stored in the FIFO queue;

(e) forwarding the command and a first data block in the FIFO queue to the SATD;

(f) receiving a request from the SATD for a next data block;

(g) forwarding the next data block in the FIFO queue to the SATD;

(h) repeating steps (f)–(g) until a trigger number of data blocks remain in the FIFO queue;

(i) requesting an additional data block from the Fibre Channel host that issued the command;

(j) receiving the additional data block and storing it in the FIFO queue;

(k) receiving a request from the SATD for the next data block and forwarding the topmost data block in the FIFO queue; and (l) repeating steps (i)–(k) until all the data has been transferred.

32. The method of claim 31, wherein holding-off the Fibre Channel host comprises:

placing the command in a command queue; and reissuing the command internally in the SCSI router and responding to the command once the preset size memory block is free.

33. The method of claim 31, further comprising the steps of:

receiving a command complete message from the SATD when a command has been completed; and forwarding the command complete message to the Fibre Channel host that issued the command.

34. A method for processing commands to a sequential access target device ("SATD") through a SCSI router in a Fibre Channel network having a plurality of Fibre Channel hosts, comprising the steps of, in the SCSI router:

(a) receiving a command from one of the plurality of Fibre Channel hosts;

(c) if the command is a tagged command, converting the command's format to an un-tagged format;

(b) if the command requires a data transfer larger than a threshold size, streaming the data from the SATD; and (c) if the command requires a data transfer smaller than the threshold size, storing the data in one or more memory buffers as they become available and forwarding the data to the Fibre Channel host that issued the command.

35. The method of claim 34, wherein streaming the data comprises:

(a) determining if a threshold number of memory blocks are free;

(b) if the threshold number of memory blocks are free, placing the threshold number of memory blocks in a buffer FIFO queue, otherwise holding-off the Fibre Channel host that issued the command;

(c) forwarding the command and a topmost memory block in the buffer FIFO queue to the SATD;

(d) receiving a data block and a request for more free memory blocks from the SATD;

(e) placing the data block in a data FIFO queue;

(f) forwarding the topmost memory block in the buffer FIFO queue to the SATD;

(g) repeating steps (d)–(f) until a trigger number of memory blocks remain in the buffer FIFO queue;

(h) forwarding a topmost data block in the data FIFO queue to the Fibre Channel host that issued the command;

(i) placing an additional memory block in the buffer FIFO queue and forwarding the topmost memory block in the buffer FIFO queue to the SATD;

(j) receiving a data block and a request for more free memory blocks from the SATD; and (k) repeating steps (h)–(j) until all the data has been transferred.

36. The method of claim 35, wherein holding-off the Fibre Channel host comprises:

placing the command in a command queue; and reissuing the command internally in the SCSI router and responding to the command once the threshold number of memory blocks are free.

37. The method of claim 35, further comprising the steps of:

receiving a command complete message from the streaming target device when a command has been completed; and forwarding the command complete message to the Fibre Channel host that issued the command.

* * * * *